US008018567B2

(12) United States Patent
Su et al.

(10) Patent No.: US 8,018,567 B2
(45) Date of Patent: *Sep. 13, 2011

(54) LIQUID CRYSTAL DISPLAY PANELS

(75) Inventors: Mu-Jen Su, Hsin-Chu (TW);
Jung-Hsiang Lin, Hsin-Chu (TW);
Chih-Ming Chang, Hsin-Chu (TW);
Ching-Yu Tsai, Hsin-Chu (TW);
Shih-Chia Hsu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 62 days.

This patent is subject to a terminal disclaimer.

(21) Appl. No.: 12/698,290

(22) Filed: Feb. 2, 2010

(65) Prior Publication Data
US 2010/0134750 A1 Jun. 3, 2010

Related U.S. Application Data

(63) Continuation of application No. 11/781,540, filed on Jul. 23, 2007, now Pat. No. 7,684,004.

(30) Foreign Application Priority Data

Aug. 14, 2006 (TW) .............................. 95129816 A

(51) Int. Cl.
*G02F 1/1339* (2006.01)
(52) U.S. Cl. ........................................ 349/157; 349/155

(58) Field of Classification Search .................. None
See application file for complete search history.

(56) References Cited

U.S. PATENT DOCUMENTS

| 4,973,138 A | 11/1990 | Yamazaki et al. |
| 5,128,785 A | 7/1992 | Yoshimoto et al. |

(Continued)

FOREIGN PATENT DOCUMENTS

TW 556035 10/2003

(Continued)

OTHER PUBLICATIONS

English language translation of abstract of TW M255422 (published Jan. 11, 2005).

(Continued)

*Primary Examiner* — Mike Stahl
(74) *Attorney, Agent, or Firm* — Thomas, Kayden, Horstemeyer & Risley, LLP

(57) ABSTRACT

A liquid crystal display panel comprises a color filter substrate, a thin film transistor array substrate, and a liquid crystal layer sealed between the two substrates. The color filter substrate has a plurality of first spacers and a plurality of second spacers thereon. The thin film transistor array substrate has a plurality of recesses for containing the second spacers. The ratio of the number of the second spacers to the number of the first spacers is between about 10 and about 90.

10 Claims, 1 Drawing Sheet

U.S. PATENT DOCUMENTS

| | | | |
|---|---|---|---|
| 5,537,235 A | 7/1996 | Ishihara et al. | |
| 5,777,710 A | 7/1998 | Okada et al. | |
| 5,838,414 A | 11/1998 | Lee | |
| 5,963,288 A | 10/1999 | Sato et al. | |
| 6,004,423 A | 12/1999 | Ruedin et al. | |
| 6,018,380 A | 1/2000 | Hu et al. | |
| 6,067,144 A | 5/2000 | Murouchi | |
| 6,078,377 A | 6/2000 | Tomono et al. | |
| 6,097,467 A | 8/2000 | Fujimaki et al. | |
| 6,486,936 B1 | 11/2002 | Sugimoto | |
| 6,671,025 B1 | 12/2003 | Ikeda et al. | |
| 6,678,030 B2 | 1/2004 | Imabayashi et al. | |
| 6,801,278 B2 | 10/2004 | Tanada et al. | |
| 6,867,840 B2 | 3/2005 | Hsieh et al. | |
| 6,924,871 B2 | 8/2005 | Washizawa et al. | |
| 7,068,342 B1 | 6/2006 | Lee | |
| 2001/0043297 A1 | 11/2001 | Arai | |
| 2005/0237469 A1 | 10/2005 | Kadotani et al. | |
| 2006/0044502 A1 | 3/2006 | Takagi | |
| 2006/0055863 A1 | 3/2006 | Sawasaki et al. | |
| 2007/0236645 A1 | 10/2007 | Hashimoto | |
| 2010/0201934 A1* | 8/2010 | Fan et al. | 349/153 |

FOREIGN PATENT DOCUMENTS

| | | |
|---|---|---|
| TW | 574535 | 2/2004 |
| TW | 574552 | 2/2004 |
| TW | 575191 | 2/2004 |
| TW | 575324 | 2/2004 |
| TW | 588178 | 5/2004 |
| TW | M255422 | 1/2005 |
| TW | 200611002 A | 4/2006 |

OTHER PUBLICATIONS

English language translation of abstract of TW 200611002A (published Apr. 1, 2006).

English language translation of abstract of TW 588178 (published May 21, 2004).

* cited by examiner

US 8,018,567 B2

LIQUID CRYSTAL DISPLAY PANELS

RELATED APPLICATIONS

This application is a continuation application of U.S. application Ser. No. 11/781,540, filed on Jul. 23, 2007, which is herein incorporated by reference.

FIELD OF THE INVENTION

The present invention is related to a structure of a liquid crystal display panel.

BACKGROUND OF THE INVENTION

One drop filling (ODF) process is used as a new generation liquid crystal manufacturing technique. The ODF process is widely used for mass production of liquid of crystal because of its advantage of largely shortening the time required to fill liquid crystal. Nevertheless, a bottle neck of the ODF process is its narrow tolerance of the amount of the filled liquid crystal. In detailed description, tolerance of the amount of the filled liquid crystal is very narrow under low temperature. Vacuum bubbles are easily generated under low temperature when the amount of the filled liquid crystal is not accurate, or photo-resist spacers located between the color filter substrate and TFT array substrate are diverged (in other word, vacuum bubble is a vacuum space generated by liquid crystal volume shrinkage under low temperature). Methods for increasing the tolerance of the amount of the filled liquid crystal include, selecting a softer material for photo-resist spacers, decreasing the contact area between the photo-resist spacers and TFT array substrate and so on. These methods allow the distance between liquid crystal cells to be modulable in the manufacturing process to increase tolerance of the amount of the filled liquid crystal.

SUMMARY OF THE INVENTION

For the purpose of increasing the tolerance of the amount of filled liquid crystal in the ODF process and the purpose of increasing pressure resistivity of the liquid crystal display panel, the embodiments of the present invention provide a liquid crystal display panel with enough pressure resistivity. The display panel comprises a color filter substrate, a TFT array substrate and a liquid crystal layer sealed between both substrates. A plurality of first spacers and a plurality of second spacers are located on the color filter substrate. A plurality of recesses is located on the TFT array substrate for containing the second spacers while the two substrates are sealed face to face. The ratio of the number of second spacers to the number of first spacers is from 10 to 90.

In another embodiment, the present invention provides a liquid crystal display panel. The display panel comprises a color filter substrate, a TFT array substrate and a liquid crystal layer sealed between both substrates. A plurality of spacers is located on the color filter substrate. A plurality of recesses is located on the TFT array substrate for containing a portion of the spacers while the two substrates are sealed face to face. The ratio of the number of recesses to the number of spacers is from 90% to 98%.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In the present ODF process, liquid crystal is dropped on the color filter substrate (or TFT substrate) in vacuum and glue is coated on the rim of the TFT substrate (or color filter substrate). Then, the color filter substrate and the TFT substrate are assembled together. A liquid crystal display panel is accomplished by removing the vacuum source and admitting atmospheric air to compress the color filter substrate or TFT substrate.

If the photo-resist spacers can not provide enough deformation when the amount of the filled liquid crystal is not accurate or the height of the spacers is not as expected, then the vacuum bubbles will be generated because the height of the spacers and the amount of the filled liquid crystal can not match the space in the liquid crystal cell between the two substrates. Although a softer photo-resist spacer can be used to solve the problem caused by the mismatch between the height of the spacers and the filled liquid crystal, the softer photo-resist spacers do not have enough pressure resistivity so that the yield of liquid crystal display panel is decreased because defects are easily generated by the compressing force required for assembling the module.

Figure 1:
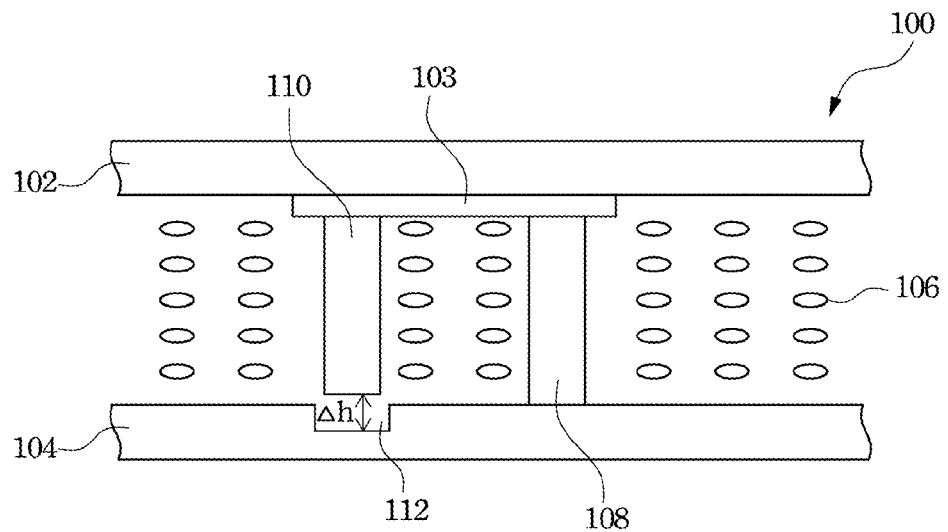
FIG. 1 illustrates a cross-sectional view of one embodiment of the present invention.

An embodiment of the present invention provides a liquid crystal display panel. FIG. 1 illustrates a cross-sectional view of one embodiment of the present invention. Refer to FIG. 1, a liquid crystal display panel 100 comprises a color filter substrate 102, a TFT substrate 104, and a liquid crystal layer 106 sealed between the color filter substrate 102 and the TFT substrate 104. The color filter substrate 102 has a plurality of first spacers 108 and a plurality of second spacers 110. The TFT substrate 102 has a plurality of recesses 112. The location of the recesses 112 corresponds to the position of the second spacers 110. The size of the recess 112 is proper for containing the second spacer 110. The color filter substrate 102 further comprises a black matrix layer 103. The preferred location of the second spacers 110 is on the black matrix layer 103 to avoid possible light leakage.

The depth of the recesses is from 0.2 μm to 0.8 μm. The height of the first spacers 108 and the second spacers 110 is from 1 μm to 10 μm. The ratio of the number of the second spacers 110 to the number of the first spacers is from 10 to 90. The location of the recesses 112 corresponds to the position of the second spacers 110 for providing supporting force when an external force is applied upon the liquid crystal display panel.

In the present embodiment, the first spacers 108 and the second spacers 110 may be disposed on the color filter substrate (or the TFT array substrate) while the recesses are formed on the TFT array substrate (or the color filter substrate).

In the present embodiment, the first spacers 108 and the second spacers 110 are different in shape, height or both. The first spacers 108 are located between the color filter substrate 102 and the TFT substrate 104. The TFT substrate 104 has recesses 112 corresponding to the position of the second spacers 110. Δh is defined as the distance between the bottom (top) portion of the recesses 112 and the second spacers 110 as shown in FIG. 1. The shape of the second spacers 110 can be cylinder, cuboid, cone-shape, or other pillar like shape. The width of the cross section of the second spacers 110 is from 9 μm to 11 μm.

Figure 2:
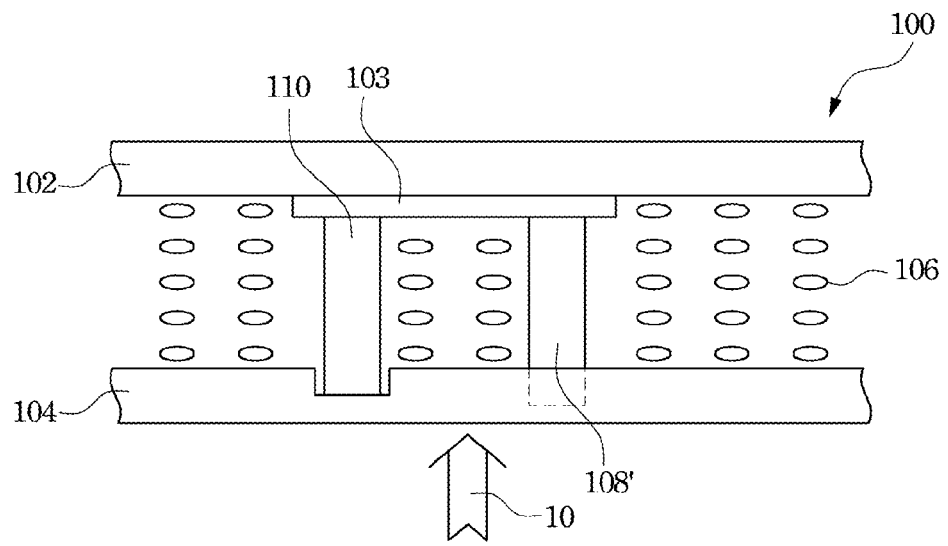
FIG. 2 illustrates a cross-sectional view of the liquid crystal display panel shown in FIG. 1 under pressure.

Referring to FIG. 2, FIG. 2 illustrates a cross-sectional view of the liquid crystal display panel shown in FIG. 1 under pressure. When an external force 10 provided by air pressure is applied upon the liquid crystal display panel while the volume of the liquid crystal layer shrinks at low temperature, the first spacers 108, such as the photo-resist spacers illustrated in the FIG. 1 will be elastically deformed and become the spacers 108' illustrated in the FIG. 2. The distance between the color filter substrate 102 and TFT substrate 104 is thus decreased so that vacuum bubbles can be avoided. The tolerance of the amount of the filled liquid crystal can be increased to allow the amount of the filled liquid crystal and the height of the spacers to be well matched and vacuum bubbles can be avoided when the change of liquid crystal volume or the drifting of the height of the photo-resist spacers occurs.

Referring to FIG. 1 and FIG. 2, the top of the second spacers 110 do not contact with the bottom (top) surface of the recesses 112 until the shortened distance between the color filter substrate 102 and TFT substrate 104 reaches Δh. The recess 112 contains the second spacer 110. The cross section area of the recess 112 is equal to or slightly larger than the cross section area of the second spacer 110. For example, in the present embodiment, a height of the first spacer 108 may be substantially equal to that of the second spacer 110. For example, in the present embodiment, the cross section area of the recess 112 may be slightly larger than a smallest or a largest cross section area of the second spacer 110.

Figure 3:
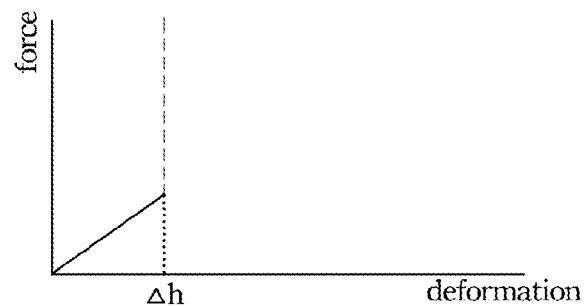
FIG. 3 illustrates a relationship scheme of deformation of the first spacer vs. the force applied on the liquid crystal display panel.

FIG. 3 illustrates a relationship scheme of deformation of the first spacer vs. the force applied on the liquid crystal display panel. When an external force 10 provided by the air-pressure is applied upon the liquid crystal display panel while the volume of the liquid crystal layer shrinks at low temperature, the first spacers is elastically deformed and the distance between the color filter substrate 102 and TFT substrate 104 is decreased. At this moment, the relationship between the shortened distance and the external force applied upon the liquid crystal display panel 100 is illustrated as the solid line in FIG. 3. When the external force increases, the shortened distance between the color filter substrate 102 and TFT substrate 104 reaches Δh and the top of the second spacers 110 contacts with the bottom (top) surface of the recesses 112. The second spacers 110 provide more supporting force to resist the external force. At this moment, the relationship between the shortened distance and the external force applied upon the liquid crystal display panel 100 is illustrated as the dotted line in FIG. 3. The shortened distance will not be increased anymore when the shortened distance reaches the maximum value of the solid line. Therefore, the liquid crystal display panel can resist more pressure. The structure disclosed in the present embodiment provides higher pressure resistivity to the liquid crystal display panel.

In another embodiment of the present invention, the first spacers and the second spacers are the same in shape and size. The first spacers and the second spacers are formed in one lithographic process. The ratio of the amount of recesses located on the TFT substrate to the total amount of the spacers is from 90% to 98%.

In the other embodiment of the present invention, the first spacers and the second spacers may be made from different materials. The first spacers are made from more elastic material, such as photo-resist and the second spacers are made from more rigid material, such as silicon oxide, silicon nitride, silicon oxynitride and so on for providing high pressure resistivity to the liquid crystal display panel.

The disclosures of the embodiments of the present invention provide different shape designs and locations of spacers. The spacers located between the TFT substrate and the color filter substrate provide enough deformation under the compressing step of the ODF process. Therefore, the tolerance of the amount of the filled liquid crystal can be increased and the vacuum bubbles can be either decreased or avoided. Furthermore, when a force is applied upon the liquid crystal display panel, the distance between the color filter substrate and the TFT substrate is decreased and the backup spacers on the color filter substrate are inserted in the recesses on the TFT substrate to provide more supporting force. Then, the liquid crystal display panel has higher pressure resistivity.

The spacers are located on one side of the color filter substrate. There are two kinds of spacers, major spacers and assistant spacers. The major spacers and the assistant spacers are the same or different in shape, size or both. The assistant spacers correspond to the recesses located on the TFT substrate to provide higher pressure-resistivity to the liquid crystal display panel when the deformation of the major spacers equals to or excesses Δh. Only the major spacers contact with the TFT substrate and the color filter substrate when the liquid crystal display panel is manufactured. While a force is provided to the liquid crystal display panel, the major spacers are deformed and the deformation of the major spacers reaches Δh, the assistant spacers begin to provide supporting force. Because the contact area between the spacers and the TFT substrate increases, the resistance to the force from outside is also increased and the deformation of the spacers will not be increased any more.

As is understood by a person skilled in the art, the foregoing preferred embodiments of the present invention are illustrated of the present invention rather than limiting of the present invention. It is intended to cover various modifications and similar arrangements included within the spirit and scope of the appended claims, such as using the design of area change between the spacers and substrate to control the deformation of the spacer to achieve the scheme illustrated in FIG. 3; the spacers are located on the black matrix or passive layer of the color filter substrate; the recesses are located on any position of the TFT substrate for corresponding the assistant spacers; using halftone mask or controlling the energy of the exposure for forming recesses and spacers, and so on, scope of which should be accorded the broadest interpretation so as to encompass all such modifications and similar structure.

What is claimed is:

1. A liquid crystal display panel comprising:
   a first substrate;
   a plurality of first spacers located on the first substrate;
   a plurality of second spacers located on the first substrate, wherein the shape of the second spacers is cylinder, cuboid, cone, or pillar;
   a second substrate comprising a plurality of recesses located thereon for containing the second spacers; and
   a liquid crystal layer sealed between the first substrate and the second substrate, wherein a ratio of the number of the second spacers to the number of the first spacers is from 10 to 90, and a depth of the recesses is from 0.2 μm to 0.8 μm.

2. The liquid crystal display panel of claim 1, wherein a width of a cross section of each of the second spacers is from 9 μm to 11 μm.

3. The liquid crystal display panel of claim 1, wherein one of the second spacers does not contact a surface of one of the recesses.

4. The liquid crystal display panel of claim 1, wherein the first spacers and the second spacers are made of same material.

5. The liquid crystal display panel of claim 1, wherein the material of the first spacers is more elastic than the material of the second spacers.

6. The liquid crystal display panel of claim 1, wherein a height of the first spacers is substantially equal to that of the second spacers.

7. The liquid crystal display panel of claim 1, wherein a height of the first spacers is from 1 μm to 10 μm.

8. The liquid crystal display panel of claim 1, wherein a height of the second spacers is from 1 μm to 10 μm.

9. The liquid crystal display panel of claim 1, wherein a cross section area of one of the recesses is larger than a cross section area of one of the second spacers.

10. The liquid crystal display panel of claim 1, wherein the second spacers are made from silicon oxide, silicon nitride or silicon oxynitride.

\* \* \* \* \*